United States Patent
Ogawa (10) Patent No.: US 9,695,975 B2
(45) Date of Patent: Jul. 4, 2017

(54) HOOK DEVICE

(71) Applicant: PIOLAX, INC., Yokohama-shi (JP)

(72) Inventor: Atsushi Ogawa, Yokohama (JP)

(73) Assignee: PIOLAX, INC., Yokohama-Shi, Kanagawa (JP)

(*) Notice: Subject to any disclaimer, the term of this patent is extended or adjusted under 35 U.S.C. 154(b) by 0 days.

(21) Appl. No.: 14/896,328

(22) PCT Filed: May 14, 2014

(86) PCT No.: PCT/JP2014/062817
§ 371 (c)(1),
(2) Date: Dec. 4, 2015

(87) PCT Pub. No.: WO2014/199768
PCT Pub. Date: Dec. 18, 2014

(65) Prior Publication Data
US 2016/0123529 A1    May 5, 2016

(30) Foreign Application Priority Data
Jun. 13, 2013    (JP) .................... 2013-124871

(51) Int. Cl.
*F16B 45/00*    (2006.01)
*F16M 13/02*    (2006.01)
(Continued)

(52) U.S. Cl.
CPC ............. *F16M 13/022* (2013.01); *B60R 7/08* (2013.01); *F16B 5/126* (2013.01); *F16B 45/00* (2013.01);
(Continued)

(58) Field of Classification Search
CPC .... B60R 7/08; B60R 7/10; B60R 7/12; B60R 7/14; B60R 7/082; B60R 11/00;
(Continued)

(56) References Cited

U.S. PATENT DOCUMENTS 3,385,547 A * 5/1968 West .................... B60R 7/10
211/99
4,221,354 A * 9/1980 Kempkers ............. B60R 7/10
224/927

(Continued)

FOREIGN PATENT DOCUMENTS

CN    101983142 A    3/2011
EP    2 508 695 A2    10/2012
(Continued)

OTHER PUBLICATIONS

International Search Report (ISR) (PCT Form PCT/ISA/210), in PCT/JP2014/062817, dated Jun. 10, 2014.
(Continued)

*Primary Examiner* — Brian Mattei
*Assistant Examiner* — Taylor Morris
(74) *Attorney, Agent, or Firm* — McGinn IP Law Group, PLLC.

(57) ABSTRACT

A hood device is provided with a frame-shape base member and a hook member. The hook member is provided with a rotation unit, a hooking unit, a first engaging unit which engages with the peripheral wall of the base member when the hooking portion is used, and a second engaging unit which engages with the peripheral wall of the base member when the hooking unit is stored. Both lateral edges of the peripheral wall of the base member are provided with a rotation support unit, a first rotation limiting unit against which the first engaging unit abuts, a second rotation limiting unit against which the second engaging unit abuts, a first holding unit into which the first engaging unit is detachably fitted, and a second holding unit into which the second engaging unit is detachably fitted.

19 Claims, 10 Drawing Sheets (51) Int. Cl.

| | | |
|---|---|---|
| *F16B 5/12* | (2006.01) | |
| *A47B 96/00* | (2006.01) | |
| *A47K 1/00* | (2006.01) | |
| *A47K 5/00* | (2006.01) | |
| *E04G 5/06* | (2006.01) | |
| *F16L 3/08* | (2006.01) | |
| *F21V 21/00* | (2006.01) | |
| *F21V 35/00* | (2006.01) | |
| *A47B 96/06* | (2006.01) | |
| *B60R 7/00* | (2006.01) | |
| *B60R 7/05* | (2006.01) | |
| *B60R 7/10* | (2006.01) | |
| *B60R 7/04* | (2006.01) | |
| *B60R 11/00* | (2006.01) | |
| *B60R 7/08* | (2006.01) | |
| *F16B 45/02* | (2006.01) | |

(52) U.S. Cl.
CPC ............... *B60R 7/04* (2013.01); *B60R 7/043* (2013.01); *B60R 7/046* (2013.01); *B60R 7/081* (2013.01); *B60R 7/082* (2013.01); *B60R 7/10* (2013.01); *B60R 11/00* (2013.01); *F16B 45/02* (2013.01)

(58) Field of Classification Search
CPC  B60R 7/04; B60R 7/043; B60R 7/046; B60R 7/081; F16B 45/00; F16B 45/02
USPC ............ 248/220.21, 220.22, 220.31, 221.11, 248/224.7, 224.8, 225.11, 225.21, 231.9, 248/304, 305, 307, 308; 224/311, 313, 224/539, 544, 553, 560, 927
See application file for complete search history.

(56) References Cited

U.S. PATENT DOCUMENTS

| | | | | |
|---|---|---|---|---|
| 4,720,028 | A * | 1/1988 | Takemura | ................. B60R 7/10 224/313 |
| 4,762,449 | A * | 8/1988 | St. Pierre | ............. B60P 7/0807 248/499 |
| 6,095,469 | A * | 8/2000 | Von Alman | ............... B60R 7/10 224/313 |
| 6,959,954 | B2 * | 11/2005 | Brandt | ...................... B60R 7/10 224/313 |
| 8,186,638 | B2 * | 5/2012 | Nishida | .................... B60R 7/08 224/313 |
| 2004/0084918 | A1 | 5/2004 | Brandt et al. | |
| 2012/0043363 | A1 * | 2/2012 | Lee | ........................... B60R 7/10 224/313 |

FOREIGN PATENT DOCUMENTS

| | | |
|---|---|---|
| JP | 3-98675 U | 10/1991 |
| JP | 2003-325267 A | 11/2003 |
| JP | 2013-107566 A | 6/2013 |

OTHER PUBLICATIONS

Chinese Office Action, dated Nov. 23, 2016 and English translation thereof.

* cited by examiner

HOOK DEVICE

TECHNICAL FIELD

The present invention relates to hook devices mounted on vehicles or the like.

BACKGROUND ART

For example, a hook device for hooking a shopping bag, a plastic grocery bag, a hand bag, a string, a rope, or the like may be provided on a back face or a side face of a seat installed in a vehicle interior, on a floor face of a luggage space, or in a trunk. As such hook device, a rotary hook device including a retractable hook is widely used in view of appearance and convenience.

For example, PTL1 describes a retractable small-article hanger including a housing having a box shape with a bottom, and a hook that is rotatably supported in a storage chamber of the housing. The housing includes an elastic tongue piece, which is flexible via a U-shaped slit, on a bottom portion of the storage chamber, a pair of protruding stopper pieces disposed on the both sides of the elastic tongue piece, a cam ridge protruding from the elastic tongue piece. The hook includes a small-article hanging portion, a V-shaped arm portion, a limiting wall disposed on the lower end edge of the hook, and a protruding portion disposed between the arm portion and the limiting wall. The arm portion of the hook is sandwiched between the pair of stopper pieces and the cam ridge of the housing, whereby the small-article hanging portion of the hook is held in the state of being stored in the storage chamber of the housing.

CITATION LIST

Patent Literature

PTL 1
JP-2003-325267-A

SUMMARY OF THE INVENTION

Problem that the Invention is to Solve

Because the small-article hanger of PTL1 includes the pair of stopper pieces disposed on the both sides of the elastic tongue piece via the U-shaped slit on the bottom portion of the housing, there is not enough space for mounting so that the stoppers have a relatively thin protruding shape. Thus, it is difficult to ensure stiffness of the stoppers. For this reason, when a large load is imposed on a hanging portion of the hook, and a large pressure force is thus exerted on the pair of stoppers, the pair of stoppers could be damaged.

Thus, an object of the present invention is to provide a hook device capable of improving the strength of a hanging portion of a hook member against the load imposed thereon (load bearing characteristics).

Means for Solving the Problem

To solve the above-described problems, the present invention provides
a base member that has a frame shape and that is mounted on a mounting hole of a mounted member via a mounting structure; and
a hook member rotatably mounted on the base member, wherein the base member includes:
a flange portion arranged to engage a peripheral edge on a front side of the mounting hole of the mounted member; and
a peripheral wall protruding from a back face of the flange portion so as to conform to an inner periphery of the mounting hole,
wherein the hook member includes:
a rotating portion rotatably supported by the base member;
a hanging portion consecutively connected with the rotating portion and arranged to project and retract from an opening on a front face of the base member in accordance with the rotation of the rotating portion;
a first engagement portion arranged to be engaged to the peripheral wall when the hanging portion projects from the opening on the front face of the base member; and
a second engagement portion arranged to be engaged to the peripheral wall when the hanging portion retracts into a back face side of the base member, and
wherein the peripheral wall includes, on its both side portions,
a rotation supporting portion arranged to rotatably support the rotating portion of the hook member;
a first rotation limiting portion with which the first engagement portion are brought into contact;
a second rotation limiting portion with which the second engagement portion are brought into contact;
a first holding portion to which the first engagement portion attachably/detachably fit when the first engagement portion are brought into contact with the first rotation limiting portion; and
a second holding portion to which the second engagement portion attachably/detachably fit when the second engagement portion are brought into contact with the second rotation limiting portion.

The present invention may preferably provide
the hook device,
wherein the base member includes a through hole inside the peripheral wall, the through hole passing through from a front face side to the back face side, and
wherein in a state where the hook member rotates to project to a maximum extent toward the back face side of the base member, a height of the peripheral wall that protrudes toward the back face side is lower than the hook member.

The present invention may preferably provide
the hook device,
wherein the first rotation limiting portion and the second rotation limiting portion are disposed on an end face on the back face side of the peripheral wall.

The present invention may preferably provide
the hook device,
wherein the peripheral wall includes protruding wall portions, which protrude higher toward the back face side, on the both side portions of the peripheral wall,
wherein the first rotation limiting portion and the second rotation limiting portion are disposed on an end face of the peripheral wall that is adjacent to the protruding wall portions,
wherein the first engagement portion or the second engagement portion has a protruding shape, and
wherein the first holding portion or the second holding portion includes holding protrusions disposed at corresponding end portions of the protruding wall portions so as to sandwich the respective engagement portion with the end face of the peripheral wall when the first engagement portion or the second engagement portion is engaged to the corresponding one of the first rotation limiting portion and the second rotation limiting portion.

The present invention may preferably provide the hook device,
wherein the first holding portion and the second holding portion include:
elastic wall portions provided with elasticity by through holes provided to the protruding wall portions; and
the holding protrusions that are provided to the elastic wall portions.

The present invention may preferably provide the hook device,
wherein the rotating portion of the hook member includes shaft portions having a circular shape in cross section that protrude from both sides of the hook member,
wherein the rotation supporting portion of the base member include hole portions, to which the shaft portions fit, on the peripheral wall, and
wherein the hole portions have an odd-shaped hole shape such that sides on a right face side of the base member have an arc shape to which the shaft portions conform, while sides on a back face side of the base member expand and extend to have a length to which an outside diameter of the shaft portions conforms.

The present invention may preferably provide the hook device,
wherein the peripheral wall of the base member includes inclined surfaces on inner surfaces of the peripheral wall that include the rotation supporting portion, the inclined surfaces being reduced in thickness gradually from the hole portions toward the back face side of the base member.

The present invention may preferably provide the hook device,
wherein the rotation supporting portion of the base member are disposed biased closer to one end portions than centers of the opposed both side portions of the peripheral wall,
wherein the first rotation limiting portion that the first engagement portion engage are disposed close to the other end portions on the opposite sides of the one end portions with respect to the rotation supporting portion,
wherein the second rotation limiting portion that the second engagement portion engage are disposed close to the one end portions with respect to the rotation supporting portion, and
wherein the first engagement portion have a shape longer as compared with the second engagement portion, and are arranged to engage along the both side portions.

Advantageous Effects of Invention

According to the present invention, when the hook member rotates and the hanging portion thereof projects from the opening on the front face of the base member, the first engagement portions of the hook member is engaged to the first rotation limiting portions of the both side portions of the peripheral wall, of which the thickness can be easily ensured and the stiffness can be maintained high, while the rotation supporting portions arranged to rotatably support the rotating portion of the hook member are provided to the both side portions of the peripheral wall. Thus, the strength of the hanging portion against the load imposed thereon can be increased.

MODE FOR CARRYING OUT THE INVENTION

Hereinafter, a hook device according to one embodiment of the present invention will be described referring to FIGS. 1 to 8.

Figure 1:
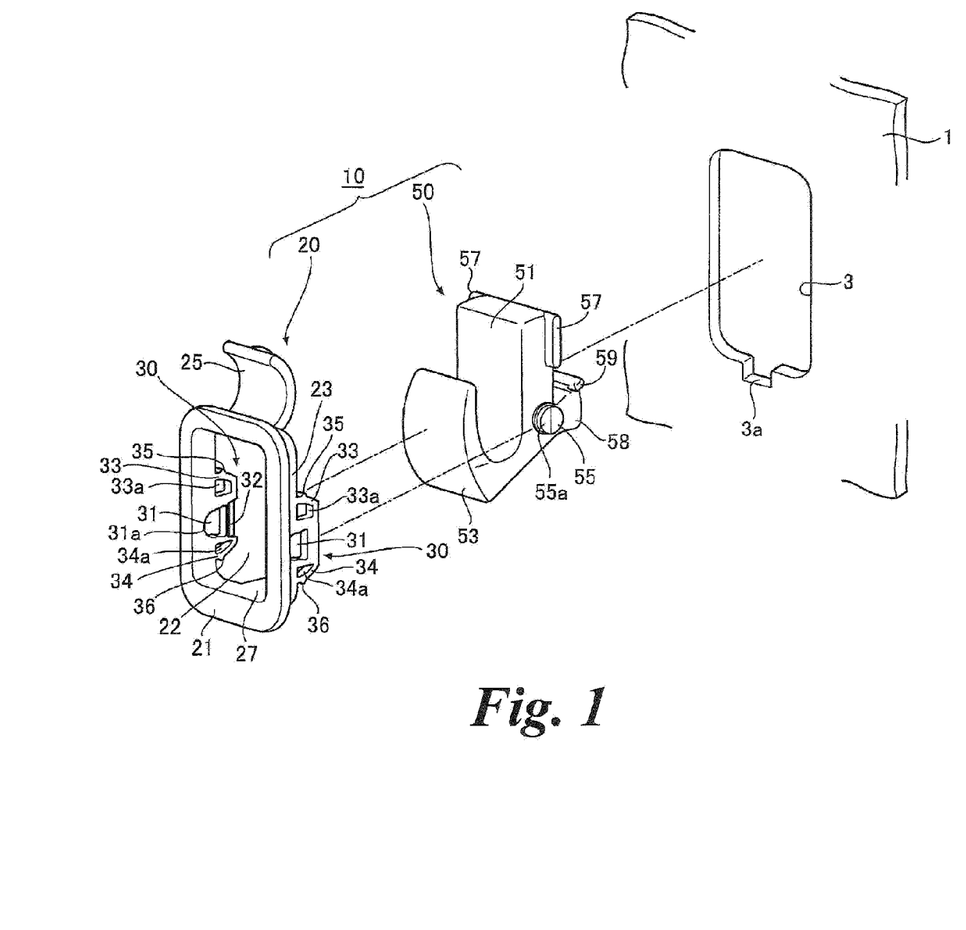
FIG. 1 is an exploded perspective view of a hook device according to one embodiment of the present invention.
Figure 2:
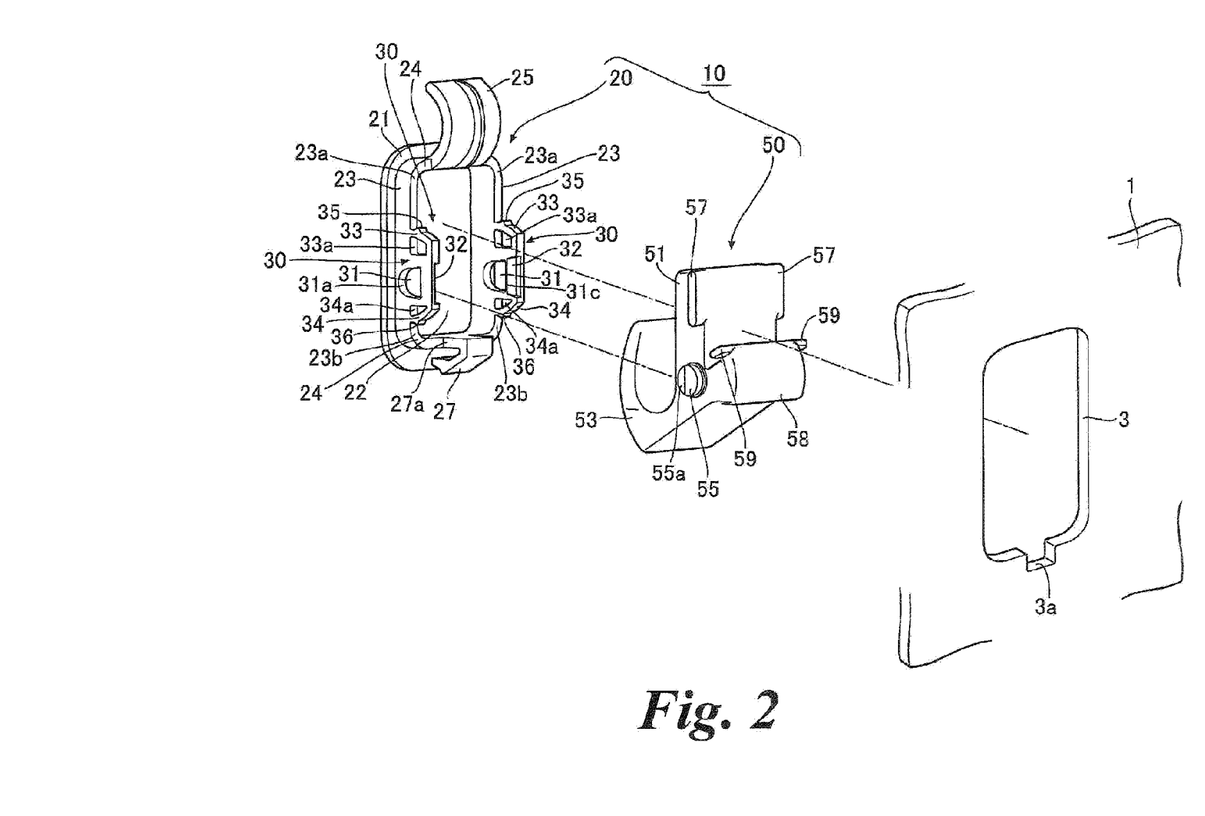
FIG. 2 is an exploded perspective view of the hook device seen from the back face side.
Figure 3:
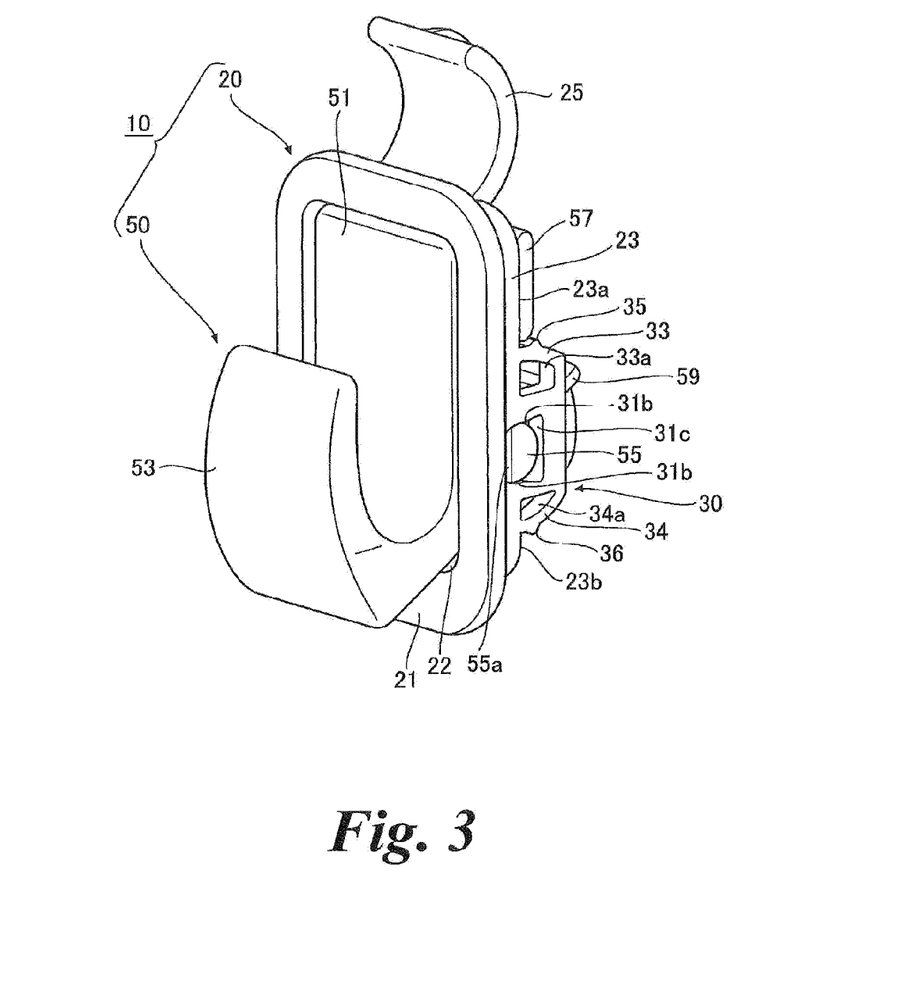
FIG. 3 is a perspective view of the hook device.

As shown in FIG. 1 and FIG. 2, a hook device 10 according to the present embodiment includes a base member 20 having a frame shape that is mounted on a mounting hole 3 provided to a mounted member 1 via a mounting structure, and a hook member 50 rotatably mounted on the base member 20.

Figure 7:
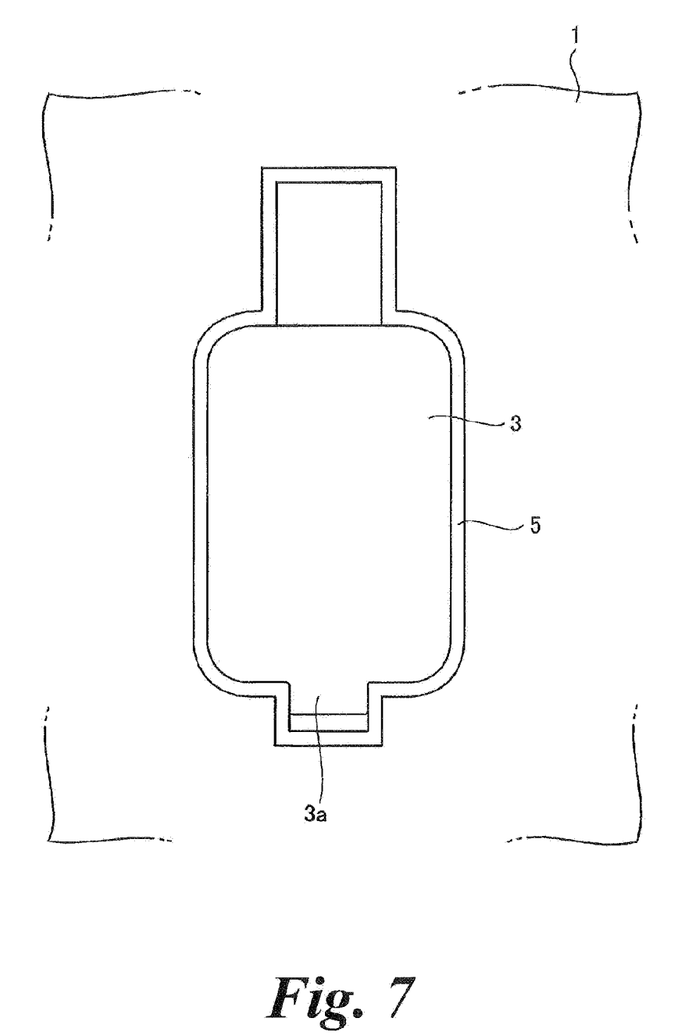
FIG. 7 is a perspective view of a mounting hole having another structure.

The mounted member 1 is not limited specifically, and examples thereof include a frame of a vehicle seat, and a side panel and a floor panel of a vehicle interior and a luggage space. The mounted member 1 according to the present embodiment is mounted at a predetermined angle along the height direction of the vehicle. The mounting hole 3 has a long hole shape, and includes a notch portion 3a at its lower end. The mounting hole 3 may be provided with a reinforcing wall 5 having a frame shape that protrudes from the back side of the mounting hole 3 at a predetermined height along the peripheral edge of the mounting hole 3 as shown in FIG. 7.

The hook member 50 has a thick plate shape, and includes a rotating portion 51 that is rotatably supported by the base member 20. A hanging portion 53 is consecutively connected with the base end portion on the front face side of the rotating portion 51. The hanging portion 53 is bent into an approximately L-shape toward the distal end portion of the rotating portion 51, and is arranged to project and retract from an opening on the front face of the base member 20 in accordance with the rotation of the rotating portion 51. The hanging portion 53 may have an approximately U-shape or horizontal U-shape, or may further have a loop shape as long as a bag's handle, a rope, or the like can be hanged on the hanging portion 53.

Shaft portions 55 and 55 having a circular shape in cross section protrude from the both side faces on the base end side of the rotating portion 51. A tapered face 55a inclined so as to get gradually lower toward the hanging portion 53 is provided to each of the shaft portions 55 on the front face side at the distal end (see FIGS. 1, 2, and 4).

As shown in FIG. 2, first engagement portions 57 and 57 having a protrusion shape that extend in a long and narrow shape are provided to the rotating portion 51 so as to project from the both sides on the back face of the distal end portion of the rotating portion 51 (the end portion on the side opposite to the hanging portion 53). A protruding portion 58 is provided to the rotating portion 51 so as to extend to the side opposite to the hanging portion 53 from the back face of the base end portion of the rotating portion 51. Second engagement portions 59 and 59 having a protrusion shape and shorter than the first engagement portions 57 are provided to the protruding portion 58 at the distal end portion so as to protrude from the both side edges of a portion of the protruding portion 58 that is close to the back face of the rotating portion. The first engagement portions 57 are arranged to be engage to the back face side of the base member 20, when the hanging portion 53 projects from the opening on the front face of the base member 20 (see FIG. 4 and FIG. 5). The second engagement portions 59 are arranged to be engaged to the back face side of the base member 20, when the hanging portion 53 retracts into the back face side of the base member 20 (see FIG. 6). The shapes and the mounting positions of the first engagement portions 57 and the second engagement portions 59 are not limited specifically.

As shown in FIG. 1 and FIG. 2, the base member 20 includes a flange portion 21 having a rectangular ring shape that is arranged to be engaged to the peripheral edge on the front side of the mounting hole 3 having a long hole shape. A peripheral wall protrudes from the inner peripheral edge on the back face of the flange portion 21 so as to conform to the inner periphery of the mounting hole 3. Thus, the base member 20 includes no bottom portion as a whole, includes a through hole 22 inside the peripheral wall, which passes through from the front face side to the back face side, and has a long frame shape (see FIG. 2).

The peripheral wall of the base member 20 in the present embodiment includes a pair of opposed both side portions 23 and 23, and a pair of opposed both side portions 24 and 24 that are shorter than the both side portions 23 and 23. The pair of opposed both side portions 24 and 24 are disposed in the vertical direction of the mounted member 1 (see FIG. 1 and FIG. 2).

Figure 4:
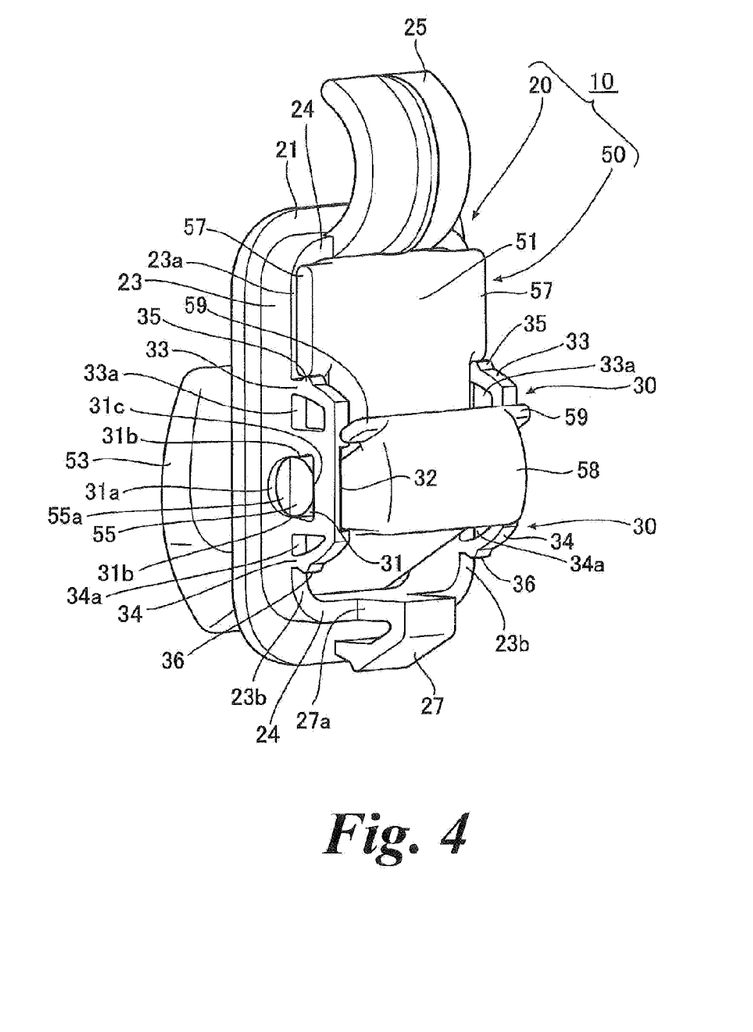
FIG. 4 is a perspective view of the hook device seen from the back face side.

As shown in FIG. 2 and FIG. 4, a hanging piece 25 bent into an arc shape extends from the back face of the upper side portion 24 of the peripheral wall, and an engagement piece 27 extends from the back face of the lower side portion 24 of the peripheral wall via a plate-shaped piece 27a. The hanging piece 25 is arranged to hang on the upper edge portion on the back side of the mounting hole 3, and the engagement piece 27 is arranged to be engaged to the peripheral edge on the back side of the notch portion 3a, and thus the base member 20 is mounted on the mounting hole 3 (see FIG. 4 and FIG. 5). To be specific, the hanging piece 25 and the engagement piece 27 define a "mounting structure" of the base member of the present invention. The structures of the hanging piece 25 and the engagement piece 27 are not limited to the above-described structures. The mounting structure is not limited to the engagement structure as in the above-described hanging piece 25 and the engagement piece 27, and may be a structure such that the base member 20 is screwed onto the mounted member 1.

As shown in FIG. 2, protruding wall portions 30 protrude higher toward the back face side from the end faces of the pair of opposed both side portions 23 and 23 of the frame-shaped peripheral wall. Each of the protruding wall portions 30 is disposed biased closer to one end portion than the center of each side portion 23. The longer end faces among the end faces of the both side portions 23 define first rotation limiting portions 23a to which the first engagement portions 57 of the hook member 50 are engaged (see FIG. 5), and the shorter end faces define second rotation limiting portions 23b to which the second engagement portions 59 of the hook member 50 are engaged (see FIG. 6).

Figure 6:
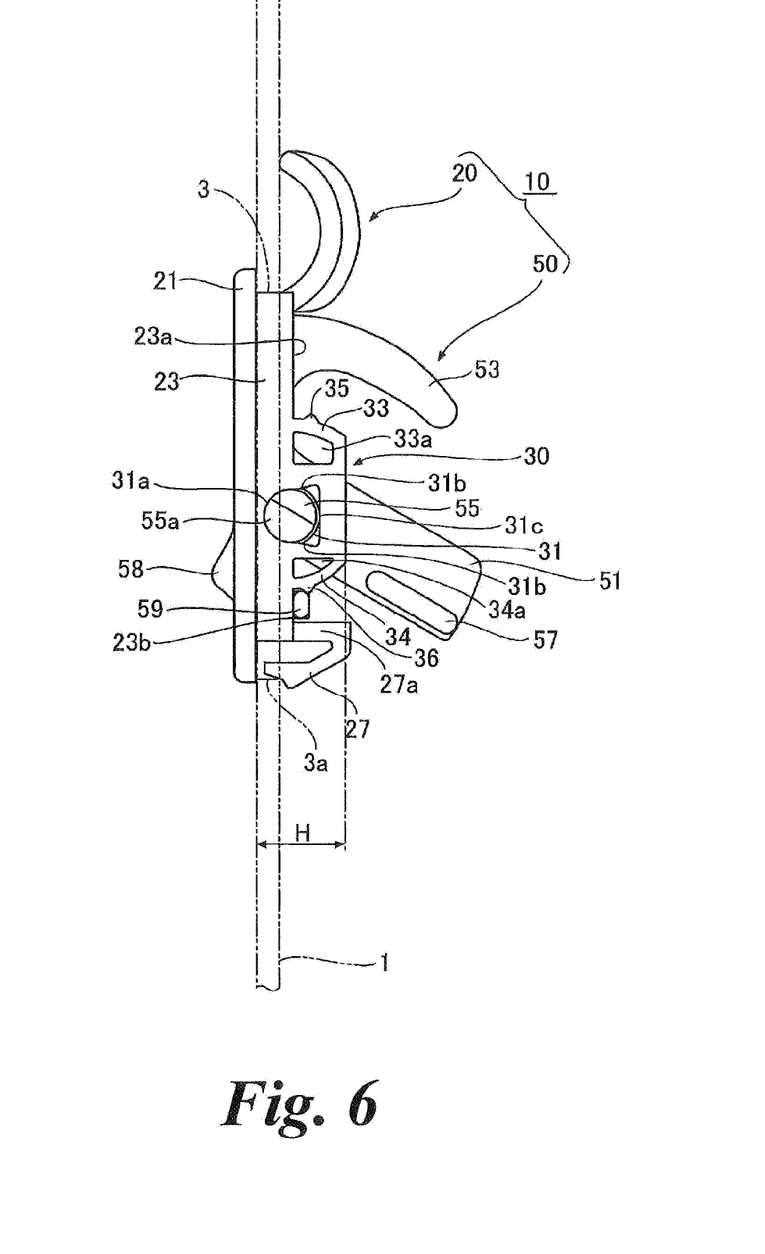
FIG. 6 is an explanatory view showing a state where a hook retracts in the hook device.

As shown in FIG. 6, in a state where the hook member 50 rotates to project to the maximum extent toward the back face side of the base member 20, a height of the peripheral wall that protrudes toward the back face side, to be specific, a height H of the protruding wall portions 30 that protrude from the flange portion 21 is made lower than the above-described maximum height of the hook member 50.

Rotation supporting portions arranged to rotatably support the rotating portion 51 of the hook member 50 are provided to the protruding wall portions 30. As shown in FIG. 1 and FIG. 2, the rotation supporting portions of the present embodiment include hole portions 31 and 31 disposed at lower portions of the pair of protruding wall portions 30 and 30 and both side portions 23 and 23. The shaft portions 55 and 55 of the hook member 50 fit into these hole portions 31 and 31 to be rotatably supported, and thus the hook member 50 is rotatably mounted with respect to the base member 20. The hook member may be rotatably mounted on the base member by providing a hole portion to the hook member side and providing a shaft portion to the base member side.

Figure 5:
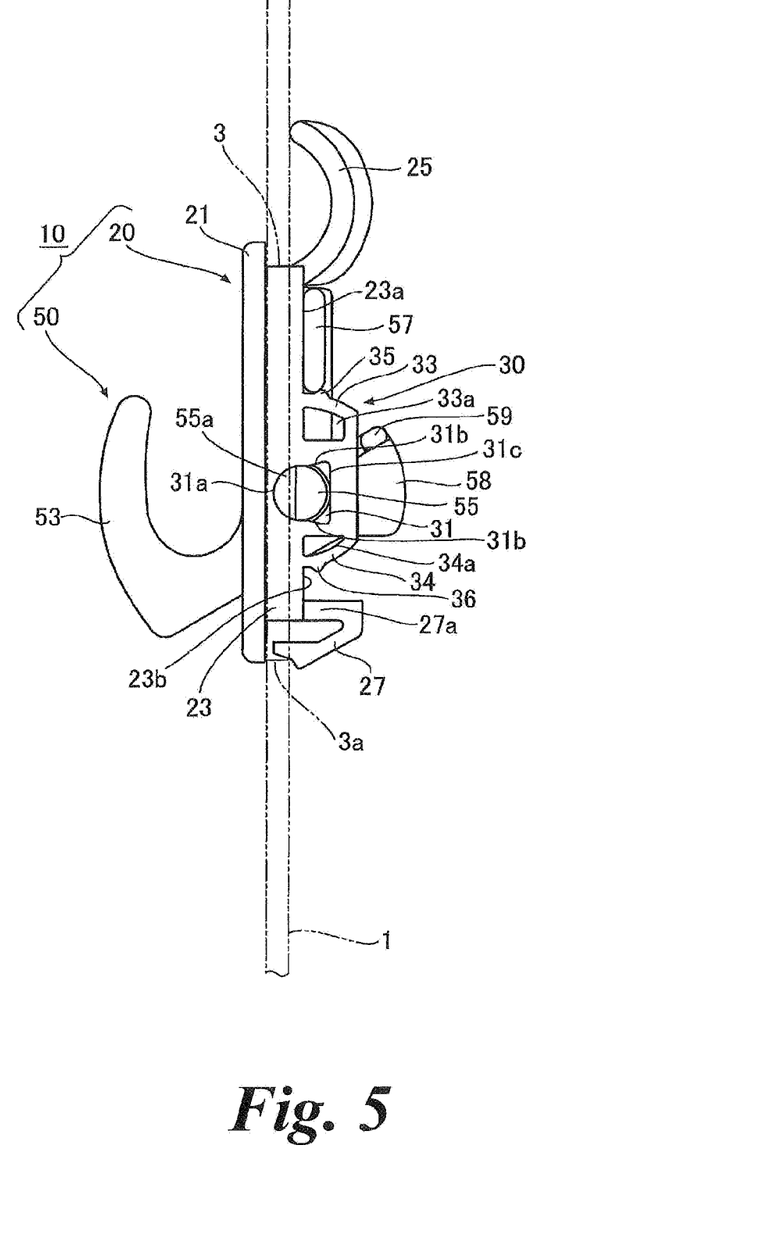
FIG. 5 is an explanatory view showing the hook using state in the hook device.

As shown in FIGS. 4 to 6, each of the hole portions 31 has an approximately semi-cylindrical odd-shaped hole shape such that a front face 31a on the side of the flange portion 21 has an arc shape to which the shaft portion 55 having a circular shape in cross section conforms, a pair of opposed side faces 31b and 31b have a tapered shape gradually expanding toward a back face 31c, and the side of the back face 31c is wider than the front face 31a. The inside diameter from the distal ends of the front faces 31a to the back faces 31c of the hole portions 31 is made to conform to the outside diameter of the shaft portions 55. Thus, even if the sides of the back faces 31c are wider, the shaft portions 55 are brought into contact with the arc-shaped front faces 31a, whereby smooth rotation can be ensured by the arc-shaped front faces 31a. Because the inside diameter from the distal ends of the front faces 31a to the back faces 31c of the hole portions 31 is made to conform to the outside diameter of the shaft portions 55, the shaft portions 55 are not easily removed from the hole portions 31 even if a load is imposed on the hook member 50. Thus, the strength of the hook member 50 against the load imposed thereon can be increased. While the hole portions 31 of the present embodiment are provided over the protruding wall portions 30 and the both side portions 23 (see FIG. 4), the hole portions 31 may be provided only to the protruding wall portions 30 or the both side portions 23. The hole portions 31 may have a circular hole shape or the like, and the shape thereof is not limited specifically.

As shown in FIG. 2, an inclined surface 32 is provided to the inner surface of each protruding wall portion 30 at a position adjacent to the back face 31c of the hole portion 31. The inclined surfaces 32 gradually reduce the thickness of the protruding wall portions 30 toward the back face side of the protruding wall portions 30.

Through holes 33a and 34a are provided to the protruding wall portions 30 on the both upper and lower sides, and form first frame-shaped walls 33 and second frame-shaped walls 34 having a bent shape that are provided with elasticity via the through holes 33a and 34a. First holding protrusions 35 and second holding protrusions 36, both of which have a mound shape with their both sides inclined, protrude from the outer peripheral faces closer to the end faces of the both side portions 23 of the first frame-shaped walls 33 and the second frame-shaped walls 34. The through holes 33a are made larger than the through holes 34a, and thus the first frame-shaped walls 33 have a structure of having greater elasticity and being more flexible than the second frame-shaped walls 34.

When the hook member 50 is rotated in a direction such that the hanging portion 53 projects from the opening on the front face of the base member 20, the first engagement portions 57 are brought into contact with the first holding protrusions 35 to warp the first frame-shaped walls 33, and surmount the first holding protrusions 35 to be engaged to the first rotation limiting portions 23a. Then, the first frame-shaped walls 33 flexibly return, and the first holding protrusions 35 fit in the first engagement portions 57 with click feeling in an attachable and detachable manner, whereby the first engagement portions 57 are sandwiched between the first holding protrusions 35 and the first rotation limiting portions 23a (see FIG. 5).

When the hook member 50 is rotated in a direction such that the hanging portion 53 retracts into the back face side of the base member 20, the second engagement portions 59 are brought into contact with the second holding protrusions 36 to warp the second frame-shaped walls 34, and the second engagement portions 59 surmount the second holding protrusions 36 to be engaged to the second rotation limiting portions 23b. Then, the second frame-shaped walls 34 flexibly return, and the second holding protrusions 36 fit in the second engagement portions 59 with click feeling in an attachable and detachable manner, whereby the second engagement portions 59 are sandwiched between the second holding protrusions 36 and the second rotation limiting portions 23b (see FIG. 6).

To be specific, in the present embodiment, the first frame-shaped walls 33 and the first holding protrusions 35 define the "first holding portion", and the second frame-shaped walls 34 and the second holding protrusions 36 define the "second holding portion".

While the base member 20 in the above-described embodiment has a structure such that the pair of protruding wall portions 30 and 30 protrude from the both side portions 23 and 23 of the peripheral wall that protrudes from the peripheral edge on the back face of the flange portion 21, the base member 20 may have a structure such that the pair of protruding wall portions 30 and 30 protrude directly from the peripheral edge on the back face of the flange portion 21 (in this case, the protruding wall portions 30 define the "both side portions of the peripheral wall" of the present invention).

While in the above-described embodiment, the frame-shaped walls 33 and 34 are provided on the both side portions of the protruding wall portions 30 via the through holes 33a and 34a, the both side portions of the protruding wall portions 30 may have a solid shape with no through hole, and the first and second holding protrusions 35 and 36 may be provided to the outer peripheries on the both side portions. Flexible side wall portions may be provided to the both side portions of the protruding wall portions 30 via slits, and the first and second holding protrusions 35 and 36 may be provided to the outer peripheries on the both side portions. The first and second holding portions that fit in the first and second engagement portions 57 and 59 of the hook member 50 are not limited to the protrusions like the first and second holding protrusions 35 and 36 in the above-described embodiment, and may have a concave shape.

Next, operation and effect of the hook device 10 having the above-described configuration will be described.

First, how to assemble the base member 20 and the hook member 50 will be described. To be specific, as shown in FIG. 2, while the hanging portion 53 of the hook member 50 is disposed in the opening on the back face side of the base member 20, and the tapered faces 55a and 55a of the shaft portions 55 are roughly matched with the inclined surfaces 32 and 32 of the pair of protruding wall portions 30 and 30. In this state, the hook member 50 is pushed from the opening side on the back face of the base member 20 toward the front face side.

Then, the tapered faces 55a of the shaft portions 55 are brought into contact with the inclined surfaces 32 of the protruding wall portions 30, and push to stretch and slightly warp the pair of protruding wall portions 30 and 30 outward while the shaft portions 55 are guided via the inclined surfaces 32 and 32, and thus the hook member 50 is being pushed in. Then, when the shaft portions 55 and 55 get into the hole portions 31 and 31, the pair of protruding wall portions 30 and 30 flexibly return, and the shaft portions 55 and 55 fit into the hole portions 31 and 31, whereby the hook member 50 can be rotatably mounted on the base member 20 (see FIG. 3 and FIG. 4).

At this time, because the inclined surfaces 32, which reduces the thickness of the protruding wall portions 30 gradually toward the back face sides of the protruding wall portions 30, are provided to the inner surfaces of the protruding wall portions 30, the shaft portions 55 of the hook member 50 are guided by the inclined surfaces 32 and 32 when the shaft portions 55 are pushed in from the back face sides of the protruding wall portions 30 of the base member 20. Thus, the shaft portions 55 can be smoothly inserted into the hole portions 31, which can improve mounting workability of the hook member 50 with respect to the base member 20.

Because the tapered faces 55a are also provided to the shaft portions 55 of the hook member 50, the tapered faces 55a are brought into contact with the inclined surfaces 32 of the protruding wall portions 30 with wide contact areas when the hook member 50 is pushed in, which allows the pair of protruding wall portions 30 and 30 to be easily pushed and stretched while enhancing the guiding performance of the hook member 50. Thus, the hook member 50 can be pushed in smoothly.

Because the base member 20 includes no bottom portion as a whole, and includes the through hole 22 inside the peripheral wall, which passes through from the front face side to the back face side, the pair of protruding wall portions 30 and 30 are easily warped when the hook member 50 is pushed in, which can improve mounting workability of the hook member 50 with respect to the base member 20.

Because the hole portions 31 provided to the base member 20 have an odd-shaped hole shape such that the sides of the back faces 31c are wider, the shaft portions 55 are easily inserted from the sides of the back faces 31c of the protruding wall portions 30, which can improve mounting workability of the hook member 50 with respect to the base member 20.

The hook device 10 assembled as described above can be mounted on the mounting hole 3 such that the hanging piece 25 is inserted obliquely into the mounting hole 3 from the front side of the mounted member 1 to be hung on the upper edge portion on the back side of the mounting hole 3, and then the hook device 10 is pushed in as a whole with respect to the mounting hole 3, whereby the engagement piece 27 is made to be engaged to the peripheral edge on the back side of the notch portion 3a while the flange portion 21 is made to be engaged to the peripheral edge on the front side of the mounting hole 3.

Figure 8:
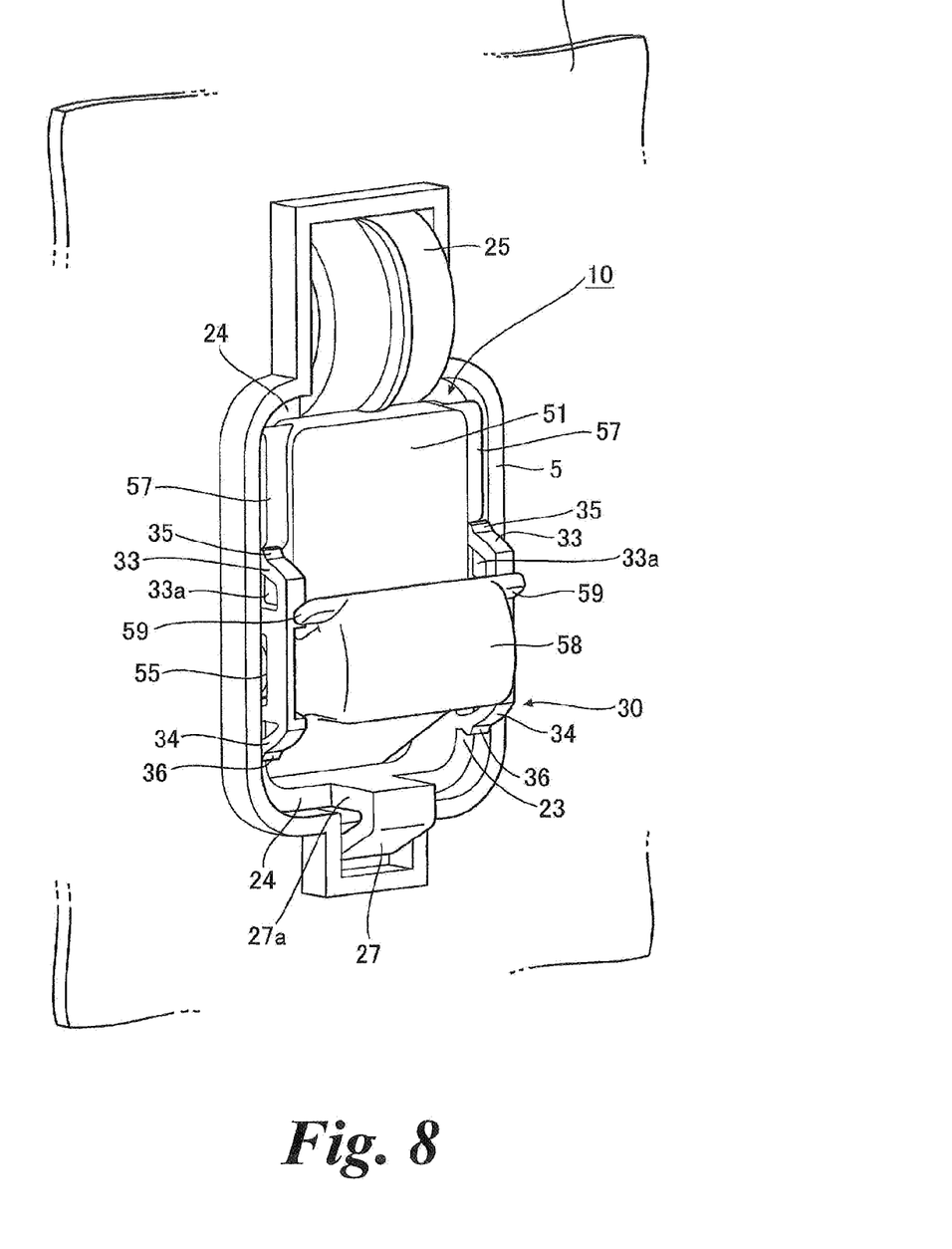
FIG. 8 is a back perspective view showing a state where the hook device is mounted on the mounting hole shown in FIG. 7.

If the reinforcing wall 5 having a frame shape is provided protruding along the peripheral edge on the back side of the mounting hole 3 as shown in FIG. 7, the outer peripheries of the peripheral walls 23 and the pair of protruding wall portions 30 and 30 of the base member 20 of the hook device 10, the hanging piece 25 and the engagement piece 27 of the hook member 50, and the like are covered as shown in FIG. 8, whereby the strength of these mounting members can be increased. Thus, even if a large load is imposed on the hook member 50, or an impact force is applied on the entire hook device 10, the above-described mounting members can be prevented from being damaged, and thus the hook device 10 can be mounted firmly on the mounting hole 3.

Then, when a bag, a package, or the like is hung on the hanging portion 53 of the hook member 50, the hanging portion 53 rotates the hook member 50 in the direction of projecting from the opening on the front face of the base member 20. Then, the first engagement portions 57 of the hook member 50 are brought into contact with the first holding protrusions 35 of the base member 20 to warp the first frame-shaped walls 33 and surmount the first holding protrusions 35 to be engaged to the first rotation limiting portions 23a. Then, the first frame-shaped walls 33 flexibly return, and the first holding protrusions 35 fit in the first engagement portions 57 with click feeling, whereby the first engagement portions 57 are sandwiched between the first holding protrusions 35 and the first rotation limiting portions 23a (see FIG. 5).

Thus, a user can recognize that the hanging portion 53 of the hook member 50 is placed at a use position. Because the first engagement portions 57 are sandwiched to be held between the first holding protrusions 35 and the first rotation limiting portions 23a, the hook member 50 can be maintained in a use state while prevented from rattling.

In the hook device 10, because when the hook member 50 rotates and the hanging portion 53 thereof projects from the opening on the front face of the base member 20, the first engagement portions 57 of the hook member 50 engaged to the first rotation limiting portions 23a of the both side portions 23 of the peripheral wall, of which the thickness can be easily ensured and the stiffness can be maintained high, while the hole portions 31 that constitute the rotation supporting portions arranged to rotatably support the rotating portion 51 of the hook member 50 are provided to the both side portions 23 of the peripheral wall, the rotation moment from the hook member 50 can be maintained low, and as a result, the strength of the hanging portion 53 against the load imposed thereon can be increased.

Because in the present embodiment, the first rotation limiting portions 23a and the second rotation limiting portions 23b are disposed on the end faces on the back face sides of the both side portions 23 of the peripheral wall, the strength of the hook member 50 against the load imposed thereon can be more increased.

When the hook member 50 is not used, the hook member 50 is rotated in a direction such that the hanging portion 53 retracts into the back face side of the base member 20. Then, the second engagement portions 59 of the hook member 50 are brought into contact with the second holding protrusions 36 of the base member 20 to warp the second frame-shaped walls 34, and the second engagement portions 59 surmount the second holding protrusions 36 to be engaged to the end faces 23b of the both side portions 23. Then, the second frame-shaped walls 34 flexibly return, and the second holding protrusions 36 fit in the second engagement portions 59 with click feeling, whereby the second engagement portions 59 are sandwiched between the second holding protrusions 36 and the end faces 23b of the both side portions 23 (see FIG. 6).

Thus, a user can recognize that the hanging portion 53 of the hook member 50 is placed at a retracting position. Because the second engagement portions 59 are sandwiched between the second holding protrusions 36 and the end faces 23b of the both side portions 23, the hook member 50 can be maintained in a retracting state while prevented from rattling.

In the hook device 10, because the hole portions 31 arranged to rotatably support the rotating portion 51 of the hook member 50 are provided to the pair of protruding wall portions 30 and 30 protruding from the back face side of the base member 20 having a frame shape as a whole while the first frame-shaped walls 33 and the first holding protrusions 35, and the second frame-shaped walls 34 and the second holding protrusions 36 that perform fitting and holding with click feeling when the hanging portion 53 is rotated in the use state or the retracting state are provided, the base member 20 can be reduced in thickness as much as possible, which allows downsizing of the entire hook device 10.

Especially in the present embodiment, because the base member 20 includes the through hole 22 inside the peripheral wall, which passes through from the front face side to the back face side as shown in FIG. 6, and a height of the peripheral wall that protrudes toward the back face side, to be specific, a height H of the protruding wall portions 30, is made lower than the height of the hook member 50 in a state where the hook member 50 rotates to project to the maximum extent toward the back face side of the base member 20, the height of the hook device 10 in the depth direction can be reduced. Thus, downsizing of the hook device 10 can be achieved while the structure of the device can be simplified, and thus the material cost can be also saved.

The present embodiment has the structure that the first holding protrusions 35 and the second holding protrusions 36 are included as the "first holding portion" and the "second holding portion" of the present invention. To be specific, the present embodiment has the structure that when the first engagement portions 57 or the second engagement portions 59 of the hook member 50 are engaged to the back face side of the base member 20, the engagement portions 57 or 59 are sandwiched between the first holding protrusions 35 or the second holding protrusions 36 and the back face side of the base member 20. Thus, the present embodiment can have the above-described relatively simple structure with which holding with click feeling can be performed. The height of the pair of protruding wall portions 30 and 30 that protrude from the back face side of the base member 20 can be made lower, which allows further downsizing of the hook device 10.

In the present embodiment, the "first holding portion" and the "second holding portion" of the present invention have the structure of including the frame-shaped walls 33 and 34 provided with elasticity via the through holes 33a and 34a, and the first holding protrusions 35 and the second holding protrusions 36.

With this structure, when the hook member 50 is rotated, the first engagement portions 57 or the second engagement portions 59 are made to surmount the corresponding first holding protrusions 35 or second holding protrusions 36 with the use of elasticity of the frame-shaped walls 33 and 34, and are sandwiched between the first holding protrusions 35 or the second holding protrusions 36 and the back face side of the base member 20. Thus, a click feeling can be obtained more clearly, and the first engagement portions 57 or the second engagement portions 59 can be fitted smoothly in the first holding protrusions 35 or the second holding protrusions 36. Because the frame-shaped walls 33 and 34 are arranged to be warped, the first engagement portions 57 or the second engagement portions 59 are prevented from being abraded when surmounting the first holding protrusions 35 or the second holding protrusions 36. Thus, durability of the hook member 50 against repetitive use can be improved.

Because the hole portions 31 provided to the base member 20 have an odd-shaped hole shape such that the sides of the back faces 31c are wider while the sides of the front faces 31a have an arc shape to which the shaft portions 55 conform, the shaft portions 55 of the hook member 50 are guided toward the front faces 31a of the hole portions 31, which allows smooth rotation.

Because in the present embodiment, the first engagement portions 57 of the hook member 50 have a shape longer as compared with the second engagement portions 59, and are arranged to be engaged to along the first rotation limiting portions 23a of the side portions 23 of the base member 20, which are longer than the second rotation limiting portions 23b, the strength of the hanging portion 53 of the hook member 50 against the load imposed thereon can be more increased. The length of the second engagement portions 59 of the hook member 50 is made shorter than that of the first engagement portions 57, and the length of the base member 20 in the longitudinal direction is made as short as possible, which allows further downsizing of the hook device 10.

Figure 9:
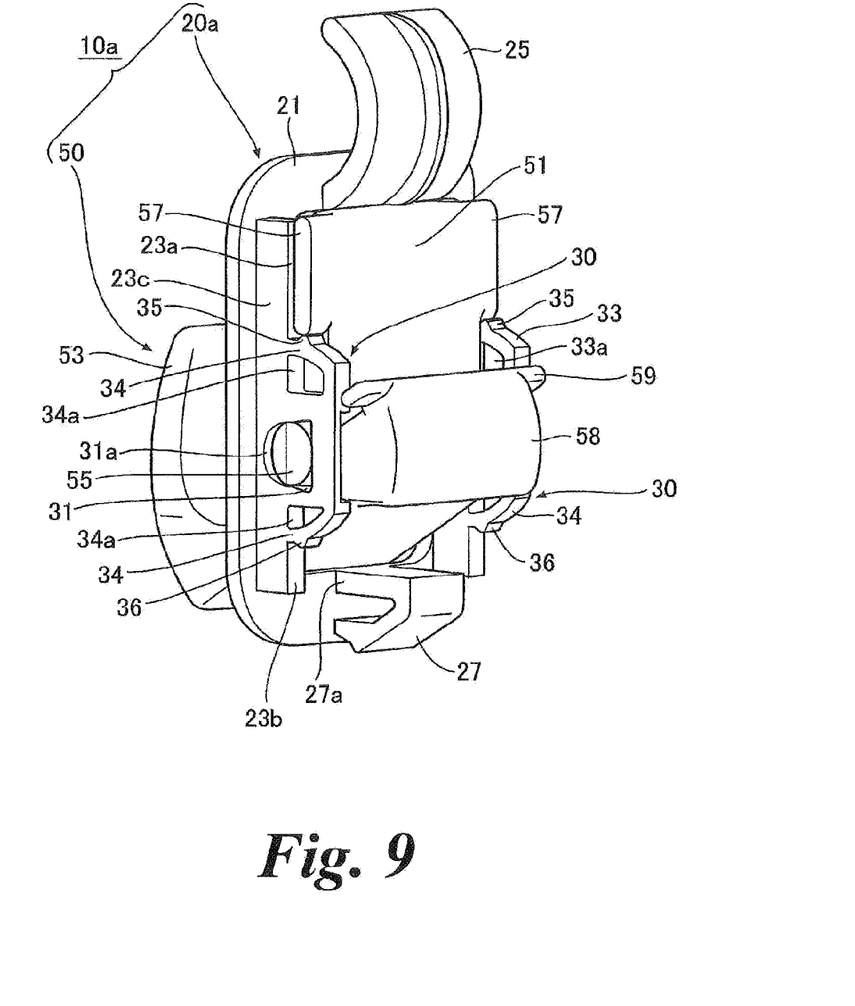
FIG. 9 is a perspective view of a hook device according to another embodiment of the present invention.
Figure 10:
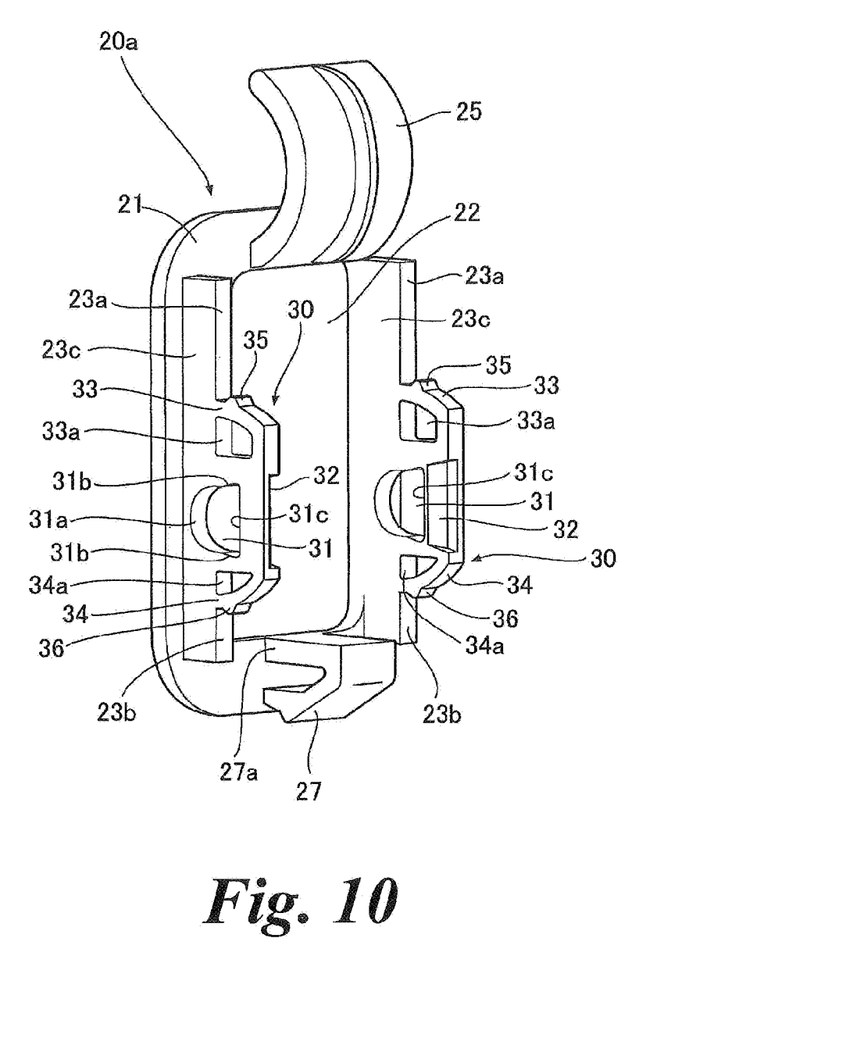
FIG. 10 is a back perspective view of a base member constituting the hook device.

A hook device according to another embodiment of the present invention is illustrated in FIG. 9 and FIG. 10. The same reference numerals are provided to the constituent elements that are substantially same as those in the above-described embodiment, and explanations of those constituent elements are omitted.

A hook device 10a in the present embodiment includes a base member 20a that is different in structure. To be specific, a pair of side portions 23c and 23c protrude opposed to each other from the peripheral edges on the back faces on a pair of opposed longer sides of the flange portion 21 of the base member 20a, and the pair of protruding wall portions 30 and 30 protrude from the end faces of the pair of side portions 23c and 23c (see FIG. 10). The hanging piece 25 extends from the back face side of one of the shorter sides of the flange portion 21 between the pair of side portions 23c and 23c, and the engagement piece 27 extends from the back face side of the other shorter side (see FIG. 10).

In the present embodiment, because the hanging piece 25 and the engagement piece 27 extend from the back face of the flange portion 21 between the pair of side portions 23c and 23c, the height of the hanging piece 25 and the engagement piece 27 can be made low, and the base member 20 can be prevented from becoming bulky, which allows further downsizing of the hook device 10.

DESCRIPTION OF REFERENCE NUMERALS AND SIGNS

1 Mounted member
3 Mounting hole
10, 10a Hook device
20, 20a Base member
21 Flange portion
22 Through hole
23 Side portion
23a First rotation limiting portion
23b Second rotation limiting portion
30 Protruding wall portion
31 Hole portion
31a Front face
32 Inclined surface
33 First frame-shaped wall
34 Second frame-shaped wall
33a, 34a Through hole
35 First holding protrusion
36 Second holding protrusion
50 Hook member
51 Rotating portion
53 Hanging portion
55 Shaft portion
57 First engagement portion
59 Second engagement portion

The invention claimed is:
1. A hook device, including:
a base member that has a frame shape and that is mounted on a mounting hole of a mounted member via a mounting structure; and
a hook member rotatably mounted on the base member, wherein the base member includes:
a flange portion arranged to engage a peripheral edge on a front side of the mounting hole of the mounted member; and
a peripheral wall protruding from a back face of the flange portion so as to conform to an inner periphery of the mounting hole,
wherein the hook member includes:
a rotating portion rotatably supported by the base member;
a hanging portion consecutively connected with the rotating portion and arranged to project and retract from an opening on a front face of the base member in accordance with a rotation of the rotating portion;
a first engagement portion arranged to be engaged to the peripheral wall when the hanging portion projects from the opening on the front face of the base member; and
a second engagement portion arranged to be engaged to the peripheral wall when the hanging portion retracts into a back face side of the base member,
wherein the peripheral wall includes, on its both side portions,
a rotation supporting portion arranged to rotatably support the rotating portion of the hook member;
a first rotation limiting portion with which the first engagement portion are brought into contact;
a second rotation limiting portion with which the second engagement portion are brought into contact;
a first holding portion to which the first engagement portion attachably/detachably fit when the first engagement portion are brought into contact with the first rotation limiting portion; and
a second holding portion to which the second engagement portion attachably/detachably fit when the second engagement portion are brought into contact with the second rotation limiting portion,
wherein the rotation supporting portion of the base member includes hole portions on the peripheral wall, and
wherein the hole portions have an odd-shaped hole shape such that a front face on a side of the flange portion has an arc shape, and a pair of opposed side faces having a tapered shape each extending toward a back face of each of the hole portions.

2. The hook device of claim 1, wherein the base member includes a through hole inside the peripheral wall, the through hole passing through from a front face side to the back face side, and
   wherein, in a state where the hook member rotates to project to a maximum extent toward the back face side of the base member, a height of the peripheral wall that protrudes toward the back face side is lower than the hook member.

3. The hook device of claim 1, wherein the first rotation limiting portion and the second rotation limiting portion are disposed on an end face on a back face side of the peripheral wall.

4. The hook device of claim 3, wherein the peripheral wall includes protruding wall portions, which protrude higher toward the back face side of the peripheral wall, on the both side portions of the peripheral wall,
   wherein the first rotation limiting portion and the second rotation limiting portion are disposed on an end face of the peripheral wall that is adjacent to the protruding wall portions,
   wherein the first engagement portion or the second engagement portion has a protruding shape, and
   wherein the first holding portion or the second holding portion includes holding protrusions disposed at corresponding end portions of the protruding wall portions so as to sandwich a respective engagement portion with the end face of the peripheral wall when the first engagement portion or the second engagement portion is engaged to a corresponding one of the first rotation limiting portion and the second rotation limiting portion.

5. The hook device of claim 4, wherein the first holding portion and the second holding portion include:
   elastic wall portions provided with elasticity by through holes provided to the protruding wall portions; and
   the holding protrusions that are provided to the elastic wall portions.

6. The hook device of claim 1, wherein the rotation supporting portion of the base member is disposed biased closer to one of end portions of the side portions of the peripheral wall than centers of opposed both side portions of the peripheral wall,
   wherein the first rotation limiting portion that the first engagement portion engage is disposed is located close to another one of end portions of the peripheral wall,
   wherein the second rotation limiting portion that the second engagement portion engage is disposed is located close to the one of end portions with respect to the rotation supporting portion, and
   wherein the first engagement portion has a shape longer as compared with the second engagement portion, and is arranged to engage along the both side portions.

7. The hook device of claim 1, wherein the rotation supporting portion includes a pair of supporting portions located on opposing walls of the peripheral wall.

8. The hook device of claim 1, wherein the rotation supporting portion includes a pair of supporting portions that face each other.

9. The hook device of claim 1, wherein the rotation supporting portion includes a pair of supporting portions located on opposing sides of the opening of the base member.

10. The hook device of claim 1, wherein the rotation supporting portion of the base member is disposed biased closer to one of end portions of the side portions of the peripheral wall than centers of opposed both side portions of the peripheral wall.

11. The hook device of claim 10, wherein the first rotation limiting portion that the first engagement portion engages is disposed close to another one of end portions of the peripheral wall.

12. The hook device of claim 11, wherein the second rotation limiting portion that the second engagement portion engages is disposed close to the one of end portions with respect to the rotation supporting portion.

13. The hook device of claim 11, wherein the first engagement portion has a shape longer as compared with the second engagement portion, and is arranged to engage along the both side portions.

14. The hook device of claim 10, wherein the second rotation limiting portion that the second engagement portion engages is disposed close to the one of end portions with respect to the rotation supporting portion.

15. A hook device, including:
   a base member that has a frame shape and that is mounted on a mounting hole of a mounted member via a mounting structure; and
   a hook member rotatably mounted on the base member,
   wherein the base member includes:
      a flange portion arranged to engage a peripheral edge on a front side of the mounting hole of the mounted member; and
      a peripheral wall protruding from a back face of the flange portion so as to conform to an inner periphery of the mounting hole,
   wherein the hook member includes:
      a rotating portion rotatably supported by the base member;
      a hanging portion consecutively connected with the rotating portion and arranged to project and retract from an opening on a front face of the base member in accordance with a rotation of the rotating portion;
      a first engagement portion arranged to be engaged to the peripheral wall when the hanging portion projects from the opening on the front face of the base member; and
      a second engagement portion arranged to be engaged to the peripheral wall when the hanging portion retracts into a back face side of the base member,
   wherein the peripheral wall includes, on its both side portions,
      a rotation supporting portion arranged to rotatably support the rotating portion of the hook member;
      a first rotation limiting portion with which the first engagement portion are brought into contact;
      a second rotation limiting portion with which the second engagement portion are brought into contact;
      a first holding portion to which the first engagement portion attachably/detachably fit when the first engagement portion are brought into contact with the first rotation limiting portion; and
      a second holding portion to which the second engagement portion attachably/detachably fit when the second engagement portion are brought into contact with the second rotation limiting portion,
   wherein the peripheral wall includes protruding wall portions, which protrude higher toward the back face side of the peripheral wall, on the both side portions of the peripheral wall, and wherein the first holding portion and the second holding portion include elastic wall portions provided with elasticity by through holes provided to the protruding wall portions.

16. The hook device of claim 15, wherein the rotating portion of the hook member includes shaft portions having a circular shape in cross section that protrude from both sides of the hook member,
wherein the rotation supporting portion of the base member includes hole portions, to which the shaft portions fit, on the peripheral wall, and
wherein the hole portions have an odd-shaped hole shape such that a front face on a side of the flange portion has an arc shape to which the shaft portions conform, and a pair of opposed side faces each having a tapered shape extending toward a back face of each of the hole portions such that an inside diameter from distal ends of the front face to the back face of the hole portions conforms to an outside diameter of the shaft portions.

17. The hook device of claim 16, wherein the peripheral wall of the base member includes inclined surfaces on inner surfaces of the peripheral wall that include the rotation supporting portion, the inclined surfaces being reduced in thickness gradually from the hole portions toward the back face side of the base member.

18. The hook device of claim 15, wherein the first holding portion and the second holding portion further include the holding protrusions that are provided to the elastic wall portions.

19. A hook device, including:
a base member that has a frame shape and that is mounted on a mounting hole of a mounted member via a mounting structure; and
a hook member rotatably mounted on the base member,
wherein the base member includes:
a flange portion arranged to engage a peripheral edge on a front side of the mounting hole of the mounted member; and
a peripheral wall protruding from a back face of the flange portion so as to conform to an inner periphery of the mounting hole,
wherein the hook member includes:
a rotating portion rotatably supported by the base member;
a hanging portion consecutively connected with the rotating portion and arranged to project and retract from an opening on a front face of the base member in accordance with a rotation of the rotating portion;
a first engagement portion arranged to be engaged to the peripheral wall when the hanging portion projects from the opening on the front face of the base member; and
a second engagement portion arranged to be engaged to the peripheral wall when the hanging portion retracts into a back face side of the base member,
wherein the peripheral wall includes, on its both side portions,
a rotation supporting portion arranged to rotatably support the rotating portion of the hook member;
a first rotation limiting portion with which the first engagement portion are brought into contact;
a second rotation limiting portion with which the second engagement portion are brought into contact;
a first holding portion to which the first engagement portion attachably/detachably fit when the first engagement portion are brought into contact with the first rotation limiting portion; and
a second holding portion to which the second engagement portion attachably/detachably fit when the second engagement portion are brought into contact with the second rotation limiting portion,
wherein the rotation supporting portion of the base member is disposed biased closer to one of end portions of the peripheral wall than centers of opposed both side portions of the peripheral wall, and
wherein the first engagement portion has a shape longer as compared with the second engagement portion, and is arranged to engage along the both side portions.

* * * * *